United States Patent
Hassan et al.

(10) Patent No.: US 12,452,093 B2
(45) Date of Patent: Oct. 21, 2025

(54) COMMUNICATIONS MANAGEMENT LEVERAGING STATUS INFORMATION FROM SHARED RESOURCES

(71) Applicant: Microsoft Technology Licensing, LLC, Redmond, WA (US)

(72) Inventors: Amer Aref Hassan, Kirkland, WA (US); Gareth L. E. Bridges, Redmond, WA (US); Michael J. Davis, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 18/597,976

(22) Filed: Mar. 7, 2024

(65) Prior Publication Data

US 2025/0286745 A1    Sep. 11, 2025

(51) Int. Cl.
  *H04L 12/18*    (2006.01)

(52) U.S. Cl.
  CPC ...... *H04L 12/1818* (2013.01); *H04L 12/1822* (2013.01)

(58) Field of Classification Search
  CPC .......... H04L 12/1818; H04L 12/1822
  See application file for complete search history.

(56) References Cited

U.S. PATENT DOCUMENTS

| | | | | |
|---|---|---|---|---|
| 7,593,984 B2 * | 9/2009 | Morris | ..... | H04L 67/54 709/224 |
| 8,271,662 B1 * | 9/2012 | Gossweiler, III | ....... | H04W 4/80 709/227 |
| 8,488,762 B2 * | 7/2013 | Fisher | ..... | H04L 67/54 379/201.1 |
| 2005/0232405 A1 | 10/2005 | Gaskill | | |
| 2007/0026882 A1 | 2/2007 | Harris | | |

(Continued)

FOREIGN PATENT DOCUMENTS

EP    2640097 A1    9/2013

OTHER PUBLICATIONS

International Search Report and Written Opinion received for PCT Application No. PCT/US2025/013287, mailed on Apr. 4, 2025, 18 pages.

*Primary Examiner* — Nazia Naoreen
(74) *Attorney, Agent, or Firm* — Schwegman Lundberg & Woessner, P.A.

(57) ABSTRACT

This disclosure relates to managing user presence in a unified communications system. A method is provided where a computing device establishes a wireless connection with a peripheral device. The computing device has a native dialer application and a unified communications client (UCC) application. A communication session is initiated via the native dialer, utilizing the peripheral device. The native dialer updates a device profile for the peripheral device with state information reflecting active engagement. The UCC application obtains this state information and updates the user's presence status to indicate current engagement in the communication session. The UCC application may communicate the user's presence status to a cloud-based service, allowing proper handling of incoming communication requests. The method ensures accurate reflection of user availability across multiple devices and applications, enhancing the communication experience within a unified communications environment.

20 Claims, 6 Drawing Sheets

(56) References Cited

U.S. PATENT DOCUMENTS

| | | |
|---|---|---|
| 2007/0081644 A1 | 4/2007 | Jachner |
| 2007/0150544 A1* | 6/2007 | Jachner .................. H04L 67/54 |
| | | 709/207 |
| 2008/0112567 A1 | 5/2008 | Siegel |
| 2012/0122435 A1 | 5/2012 | Sarkissian |
| 2015/0134759 A1 | 5/2015 | Pattan |
| 2016/0066167 A1 | 3/2016 | Goldman |
| 2019/0068734 A1* | 2/2019 | Cutler .................... H04N 7/147 |
| 2021/0160335 A1* | 5/2021 | Bellet ..................... G06F 9/543 |
| 2023/0262140 A1* | 8/2023 | Benrikhi ............... H04L 51/043 |
| | | 709/223 |

* cited by examiner

COMMUNICATIONS MANAGEMENT LEVERAGING STATUS INFORMATION FROM SHARED RESOURCES

TECHNICAL FIELD

The present disclosure relates to the technical fields of communication protocols and device profiles, including techniques for managing and leveraging shared device profiles of input and output devices that may be utilized by multiple applications and/or computing devices to improve communications management.

BACKGROUND

Advancements in communication protocols and wireless technology have enabled an ecosystem of interconnected devices and communication applications. An integrated input and/or output device, such as a speaker or microphone that is built-in to a computing device, can be accessed and used by multiple applications at the same time. Similarly, external or peripheral devices like speakers, microphones, headphones, earbuds, and displays can now easily interoperate with multiple computing devices through protocols like Bluetooth®, Wi-Fi Direct®, Near Field Communication (NFC), and Universal Serial Bus (USB), among others. Room-based conferencing equipment can also leverage these advancements to share audio and video capabilities between applications and between devices.

By way of example, a conferencing device that includes a speaker, microphone, and display, as may be provided in a conference room, can be wirelessly paired with multiple computing devices and multiple communication applications simultaneously, allowing different applications on the same or different computing devices to connect and leverage the audio and video capabilities of the in-room conferencing device. Similarly, wireless headphones with multipoint Bluetooth® support can concurrently connect to a mobile phone (e.g., a smartphone) and a computer. Universal USB compatibility also enables wired peripheral sharing across applications and devices.

The interoperability of the communication applications, computing devices and shared peripherals introduces new use cases, but also potential challenges and problems. For example, if a user is actively engaged in a phone call via a native dialer application on their mobile computing device (e.g., mobile phone) using shared Bluetooth® headphones, an incoming call request received in a voice-over-IP client application on their laptop may still attempt to ring through and disrupt the user during the active call. Additionally, the user's availability status across the multiple applications and devices may be difficult to accurately determine in an environment with multiple devices having multiple communication applications and sharing resources (e.g., peripheral devices). If a user declines or misses a call in one application because they are utilizing a shared peripheral for a call in a second application, their user presence status would still display as available in the first application. This demonstrates the need for improved techniques for managing shared peripheral state across interconnected applications and devices.

BRIEF DESCRIPTION OF THE DRAWINGS

Embodiments of the present invention are illustrated by way of example and not limitation in the figures of the accompanying drawings, in which.

DETAILED DESCRIPTION

Figure 1:
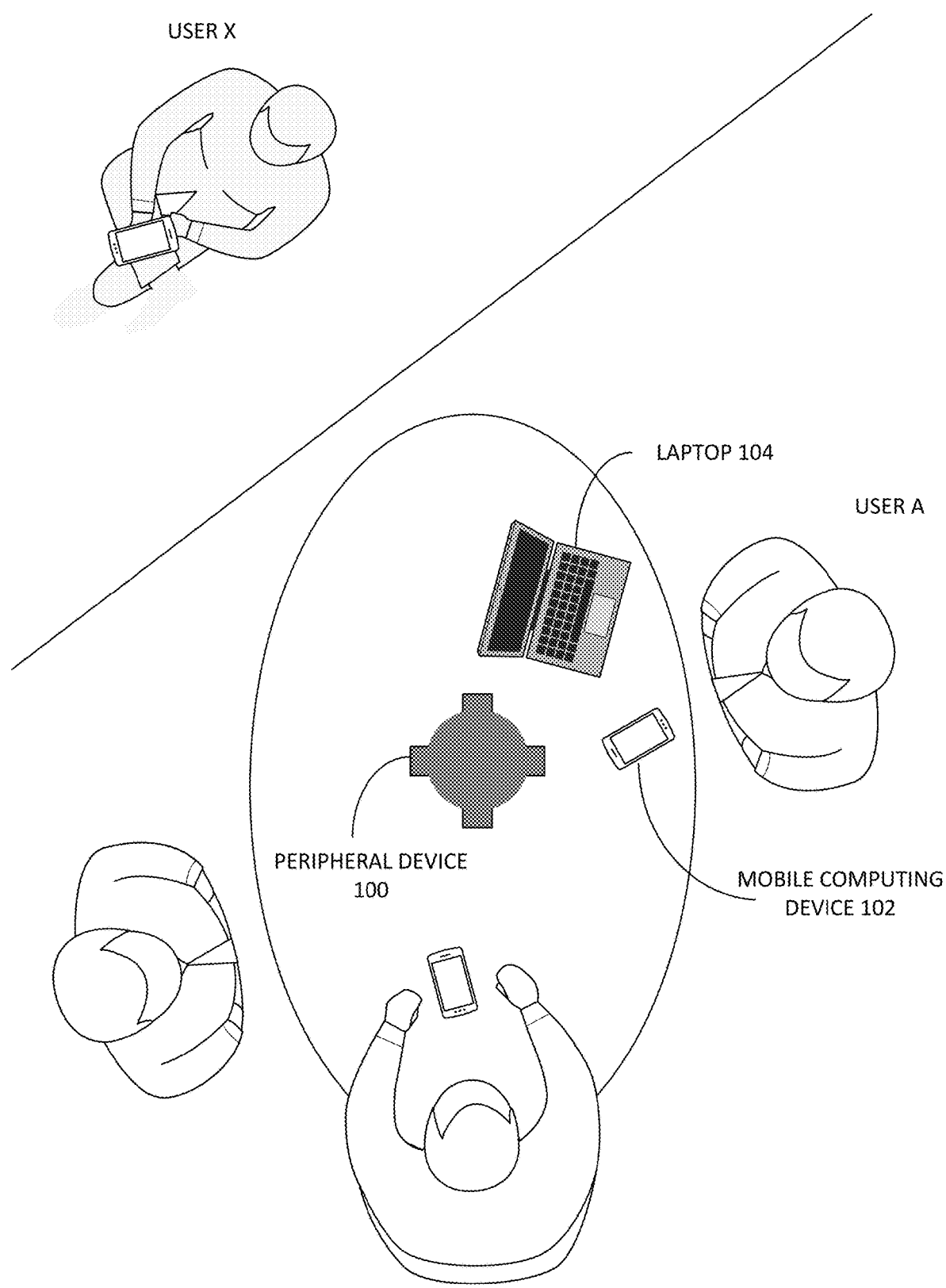
FIG. 1 is a diagram illustrating a computer-networking environment in which an embodiment of the invention may be deployed, consistent with some examples.

Described herein are techniques for the integration of various shared resources, e.g., integrated input/output ("I/O") device and/or external or peripheral devices) within a communications system and service, emphasizing the interoperability and sharing of device state information across various communication applications. More precisely, embodiments of the invention include methods and systems that enable the identification, linking, and management of the operational state of an integrated I/O device and/or peripheral device, including audio and video devices, for purposes of identifying, updating and otherwise indicating a user presence status, for a user. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

With modern communications systems and service, users often interact with multiple communication applications across various devices to engage in communication sessions. These communication applications can range from the native dialer on a mobile phone to more complex client applications for unified communications (UC) platforms, including applications executing on mobile phones, laptops, desktops, tablets, augmented reality (AR) headsets, virtual reality (VR) headsets, mixed reality headsets, and other specialized devices. A significant problem arises when these communication applications operate in silos, lacking the technical capability to communicate with one another regarding the user's current state of attention and availability. Without inter-application communication, there is no mechanism for one application to be aware of the user's engagement in a communication session initiated by another application, leading to a disjointed and often disruptive user experience.

The absence of shared user state information between applications can result in several issues. Firstly, it can lead to interruptions during critical communication sessions, as incoming communication requests from other applications may not be aware that the user is already engaged, via a different application executing on the same or a different device. This can cause unnecessary distractions and can be particularly problematic in professional settings where uninterrupted focus is desired. Secondly, the lack of interoperability between communication applications and services can lead to a misrepresentation of a user's availability status across different platforms, as each application may independently indicate a user's presence state indicator as available, away, or busy without an accurate reflection of the user's actual engagement. Lastly, the lack of shared state information across communication applications and devices can result in inefficient handling of incoming communication requests, such as calls being forwarded to voicemail or missed entirely, without providing the caller with accurate feedback on the user's availability. Several examples of the various issues that may arise are set forth below in connection with the description of FIG. 1.

In the scenario depicted in FIG. 1, User A is seated at a conference table equipped with a computing resource, specifically a conferencing device (e.g., peripheral device 100) that includes a speaker and microphone. User A has both his laptop 104 and mobile computing device (e.g., mobile phone) 102 on the table, and both the mobile phone 102 and laptop 104 are paired with and connected to the conferencing device 100. While User A is actively engaged in a conference call using the native dialer application on his mobile phone 102, which utilizes the conferencing device's speaker and microphone for audio input and output, an incoming call directed to User A's UC client application may arise. This UC client application could be executing on either User A's mobile phone 102 or laptop 104. Should the UC client application receive and announce such an incoming call from User X (e.g., by playing an audible sound to indicate the incoming call), the incoming call has the potential to be highly disruptive. The UC client application, unaware of the ongoing conference call on the native dialer application, may play an audible notification sound to alert User A of the incoming call. This notification sound could interrupt the flow of the conference, distract User A and other participants, and potentially be heard by User X and others on the line, thereby undermining the professionalism and continuity of the ongoing conference session.

In a further illustration of potential disruptions within a communication environment, consider a second example where User A is engaged in a conference call using a UC client application, which may be executing on either User A's mobile phone 102 or laptop 104, as shown in FIG. 1. During this conference call, if an incoming call is received by the native dialer application on User A's mobile phone 102, this could lead to a similar disruptive outcome. The native dialer application, upon receiving the call, is likely to activate a ringtone or vibration alert on the mobile phone 102. This alert can interrupt the ongoing conference call by diverting User A's attention away from the ongoing conversation to address the incoming call. Such an interruption not only affects User A's focus and participation in the conference call but may also be audible to other participants, thereby disrupting the collaborative communication experience and potentially causing confusion or delays in the proceedings of the conference.

User A's devices, including both the mobile phone 102 and laptop 104, are typically equipped with multiple communication applications that are capable of executing concurrently. These communication applications, while providing a range of communication modalities over different networks or platforms, operate in isolation without the technical means to exchange state information amongst themselves. This lack of inter-application communication presents a technical problem, as there is no mechanism in place for these applications to indicate or be aware of User A's active engagement in a communication session on another communication application. Consequently, when User A is immersed in a call using one communication application, other applications remain oblivious to this engagement and may continue to signal incoming communication requests, such as calls or messages, as if User A were available. This inability to share state information across applications can lead to overlapping notifications, resulting in acoustic disruptions and divided attention, which not only hampers the user's experience but also undermines the efficiency of communication sessions. The technical challenge, therefore, lies in enabling these disparate applications to communicate and synchronize presence and state information to accurately reflect User A's real-time engagement and availability across all communication platforms.

Consistent with some embodiments, the technical solution to the aforementioned technical problems involves the innovative use of communication protocols and shared device profiles for peripheral devices. A peripheral device, such as a Bluetooth® speaker or headset, can have a device profile that contains state information about its current state. This device profile can be stored either on the peripheral device itself or on each computing device that connects to the peripheral, such as User A's mobile phone 102 or laptop 104. Additionally, the device profile may be concurrently present on the peripheral device and all connected computing devices, ensuring that each device maintains an up-to-date record of the peripheral's state. Synchronization protocols may be employed to keep these device profiles in harmony, allowing for real-time updates and consistent communication of the peripheral's status across the interconnected devices.

Consistent with some embodiments, a device profile is accessible through protocols that enable pre-association service discovery over various connection methods like Wi-Fi®, Bluetooth®, and USB. An example of such a protocol is described in IEEE 802.11aq, which allows devices to discover services before they fully connect or associate. This means that a device can understand what services a peripheral device offers and its current status even before establishing a full connection.

Consistent with some embodiments, a device profile may include comprehensive details about the peripheral's state. This encompasses information about which applications are currently paired with the peripheral device, the existence and state of any active communication sessions that are ongoing through specific communication applications, and in certain cases, device and user ID information. This level of detail in a device profile will allow for managing a user's presence status across different platforms. Accordingly, the device profile is dynamically updated to reflect the current state of the peripheral device. For example, when User A starts a call using the native dialer application on their mobile phone, the device profile on the peripheral device is updated to indicate that it is actively engaged in a communication session. Similarly, if User A is on a call using a UC client application on their laptop, this information too is recorded in the device profile.

The updated device profile is then used by various computing devices to manage user presence status information effectively. When an incoming call arrives at a communication application that is not currently in use, the application can query the device profile to determine if the user is already engaged in another call. If the shared device profile indicates that the user is busy, the communication application can handle the incoming call appropriately—by silencing the ringtone, diverting the call to voicemail, providing a busy signal to the caller, or announcing to the caller the user presence status—thereby avoiding disruptions to the ongoing communication session.

In some embodiments, the state information extracted from a shared device profile for a peripheral device is leveraged to update the user presence status, for a user, within a cloud-based user presence service associated with a communications service or system, such as a UC platform or service. This cloud-based service acts as a centralized repository for presence information, ensuring that a user's availability is accurately reflected across all endpoints of the UC platform. When a device profile for a shared peripheral device indicates that a user is engaged in a communication session (e.g., an audio or video call), the UC client application communicates this status to the cloud service, which then updates the user's presence status accordingly. As such, even when a user is engaged in a communication session via a communication application (e.g., a native dialer application) that is not provided by the UC service provider, the state information can be used to update the user presence status. Subsequently, any attempt by other users or services to initiate communication with a busy user can be informed of the user's unavailability in real-time. This solution ensures that the user's presence status is accurately reflected across all communication applications, and incoming calls are handled in a manner that respects the user's current engagement. Moreover, the system-wide update to the user presence service prevents redundant call attempts and enables efficient call routing, such as directing calls to a voicemail or messaging service, thus streamlining communication workflows within the UC environment. By leveraging the device profile of a shared peripheral device, the technical problem of inter-application communication of state information is effectively addressed, leading to a more seamless and professional communication experience.

In some embodiments, the computing resource involved in managing user presence is not limited to external peripheral devices but extends to integrated devices within the computing device or system itself, such as integrated input/output devices. Examples of these integrated devices include, but are not limited to, built-in speakers, microphones, web cameras, and touch input surfaces. In these scenarios, rather than updating a device profile for an external peripheral device, a system status resource is updated to reflect the operational state of the integrated device when it is actively being used. This system status resource serves a similar purpose to the device profile but is tailored to account for resources that are inherently part of the computing device's architecture.

The system status resource could be represented in various forms depending on the system architecture and the specific integrated device in question. For instance, it might be a memory register within the device's hardware that stores flags or status codes indicating the current operational state of integrated devices. Alternatively, it could be a section within the system's software, such as a status table or a registry entry in the operating system, that maintains dynamic records of each integrated device's activity and availability. This system status resource is accessible by communication applications running on the device, enabling them to ascertain whether an integrated device is currently engaged in an active communication session. For example, if User A is participating in a video call using the device's integrated web camera, the system status resource would be updated to reflect that the camera is in use, thereby informing other applications of User A's unavailability for additional video calls. Similarly, if the built-in microphone is being utilized for an audio recording or communication session, its status would be updated in the system status resource, allowing communication applications to manage incoming requests in a manner that avoids disruptions and respects the user's current engagement. This approach ensures that the operational state of both peripheral and integrated computing resources is effectively leveraged to manage user presence across multiple communication platforms, enhancing the overall communication experience within the unified communications environment. Other aspects and advantages arising from the various embodiments of the present invention will be readily apparent from the description of the several figures that follows.

Figure 2:
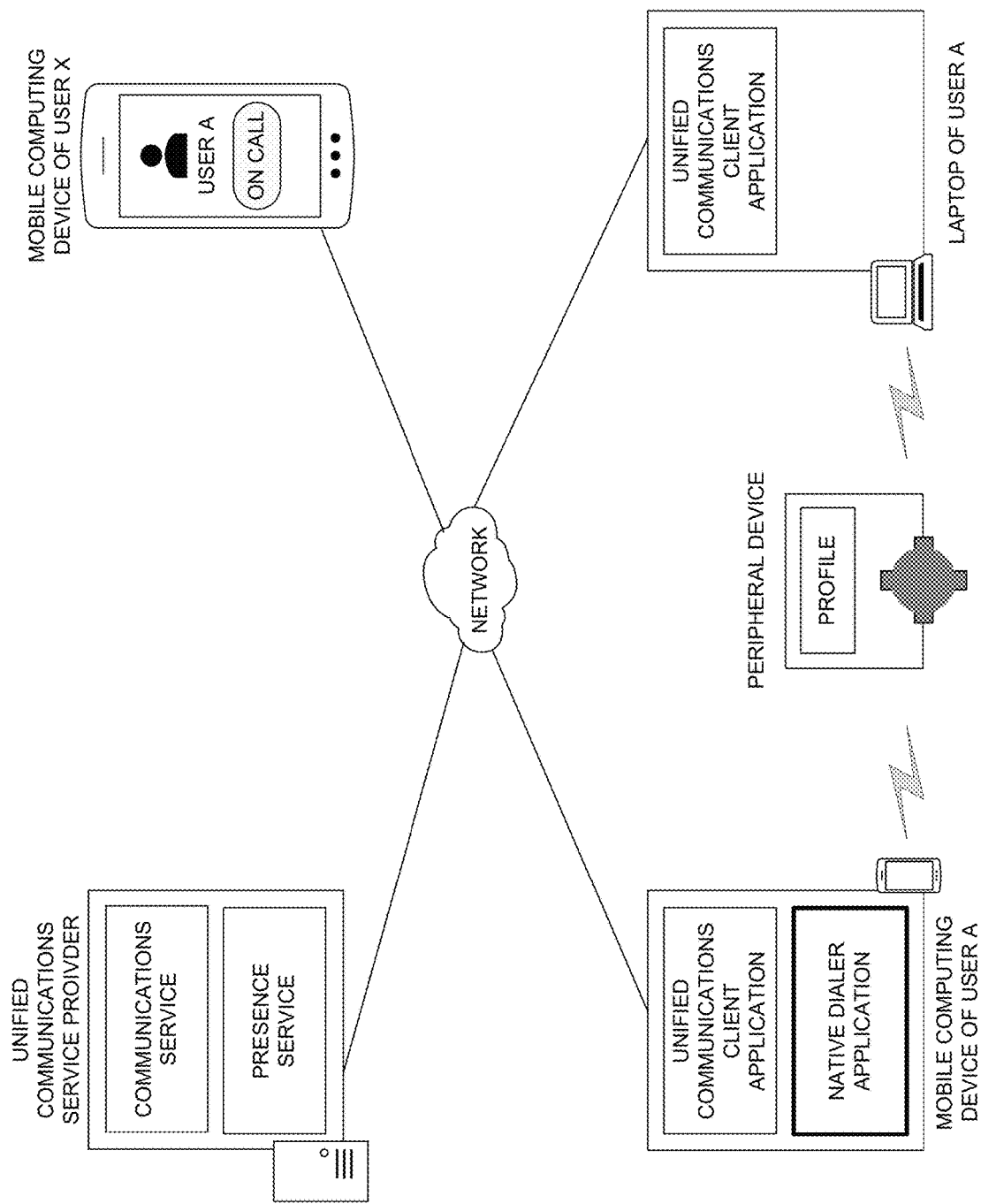
FIG. 2 is a diagram depicting the interaction between a unified communications (UC) client application, a native dialer application on a user's mobile computing device, and a peripheral device for updating user presence status, consistent with some examples.

FIG. 2 provides a visual representation of the interaction between various components within a communications environment 200, showcasing how different embodiments of the invention operate in conjunction with the various devices. At the center of FIG. 2 is a peripheral device 202. While this device is depicted in FIG. 2 as a conference device including input (microphone) and output (speaker) mechanisms, in various embodiments, the peripheral device 202 may take any of a wide variety of form factors, and have varying capabilities. For example, consistent with different embodiments of the invention, the peripheral device 202 may be a personal device, such as a headset, headphones, earbuds, and so forth. In some embodiments, the peripheral device may be or include a display or monitor. Generally, the peripheral device 202 will be one that includes audio-visual components and facilitates communication. The peripheral device 202 in FIG. 2 is shown to be wirelessly connected to User A's mobile computing device 204, which is equipped with both a native dialer application 204-A and a UC client application 204-B, such as Microsoft Teams® or a similar platform.

The mobile computing device 204 of User A is also depicted as being part of a network 210 that enables connectivity and communication with other devices, such as the mobile computing device of User X 212. This network 210 facilitates the exchange of data and state information between the devices and the peripheral device 202, allowing for the coordination of presence status and call handling.

Consistent with some embodiments of the invention, the native dialer application 204-A on User A's mobile computing device 204 initiates a communication session, such as a phone call, using the peripheral device 202. As the call is established, the native dialer application 204-A updates the device profile 202-A of the peripheral device 202 to reflect its active state, indicating that it is currently engaged in a communication session.

Simultaneously, the UC client application 204-B on the same mobile computing device 204 is configured to obtain the state information from the peripheral device's profile 202-A. By doing so, the UC client application 204-B can infer that User A is currently occupied in a communication session, even though the session was not initiated through the UC client application 204-B itself. This inference allows the UC client application 204-B to update User A's presence status within the unified communications system 206 to reflect that User A is unavailable for additional calls or communication sessions. Accordingly, when user X, using his or her mobile computing device 212, attempts to place a call to User A via the UC system or platform 206, the user interface of the UC client application on the mobile computing device 212 of User X will present the user presence status of User A (e.g., "On Call"), thereby informing User X of User A's current status as unavailable.

Furthermore, FIG. 2 illustrates how the UC client application 204-B communicates User A's updated presence status to a cloud-based presence service 206-B associated with the unified communications system 206. This service acts as a central repository for presence information, ensuring that any incoming communication requests directed to User A through the UC platform are informed of their current unavailability. For instance, if User X attempts to initiate a call to User A via the UC client application, the presence service 206-B can notify User X that User A is currently engaged and cannot take the call. The display of User A's presence status to User X not only assists User X by providing real-time information about User A's availability but also enhances overall network efficiency by preventing unnecessary call attempts and the associated network traffic. This proactive communication of presence status helps to optimize network resources and reduces the load on the system, contributing to a more streamlined and efficient communication experience within the network.

The detailed operation of an embodiment of the invention as depicted in FIG. 2 demonstrates a sophisticated approach to managing user presence across multiple communication applications and multiple devices. By leveraging the device profile of the shared peripheral resources and enabling applications to access and interpret this information, embodiments of the invention provide a seamless and non-disruptive communication experience for users like User A, who may be engaged in important calls or conferences.

Even in scenarios where User A's mobile computing device 204 does not have a UC client application installed, a UC client application 208-A on a different device 208 may access the shared profile 202-A of the peripheral device 202 and update the user's presence status accordingly. For instance, User A's laptop 208, which may be a separate computing device equipped with a UC client application 208-A, can access the shared peripheral device's profile 202-A. This is particularly useful when User A is engaged in an active communication session via the native dialer application 204-A on their mobile computing device 204. The laptop's UC client application 208-A can communicate with the peripheral device 202 to obtain its current state information from the device profile 202-A. Upon determining that the peripheral device 202 is in use by User A, the UC client application 208-A on the laptop 208 can then update User A's presence status within the unified communications system 206 to reflect their unavailability.

This inter-device communication exemplifies the capability to maintain accurate user presence information across a user's ecosystem of devices. By utilizing the shared profile 202-A of the peripheral device 202, the UC client application on User A's laptop can ensure that User A's presence status is consistent and up-to-date, regardless of which device initiated the communication session. This ensures that other users within the unified communications system, such as User X, are provided with real-time presence information, even if the active communication session is occurring on a device without a UC client application. The system's ability to synchronize presence information across devices not only enhances the user experience by preventing interruptions and unnecessary call attempts but also streamlines communication within the network by reducing redundant traffic and optimizing the use of network resources.

Figure 3:
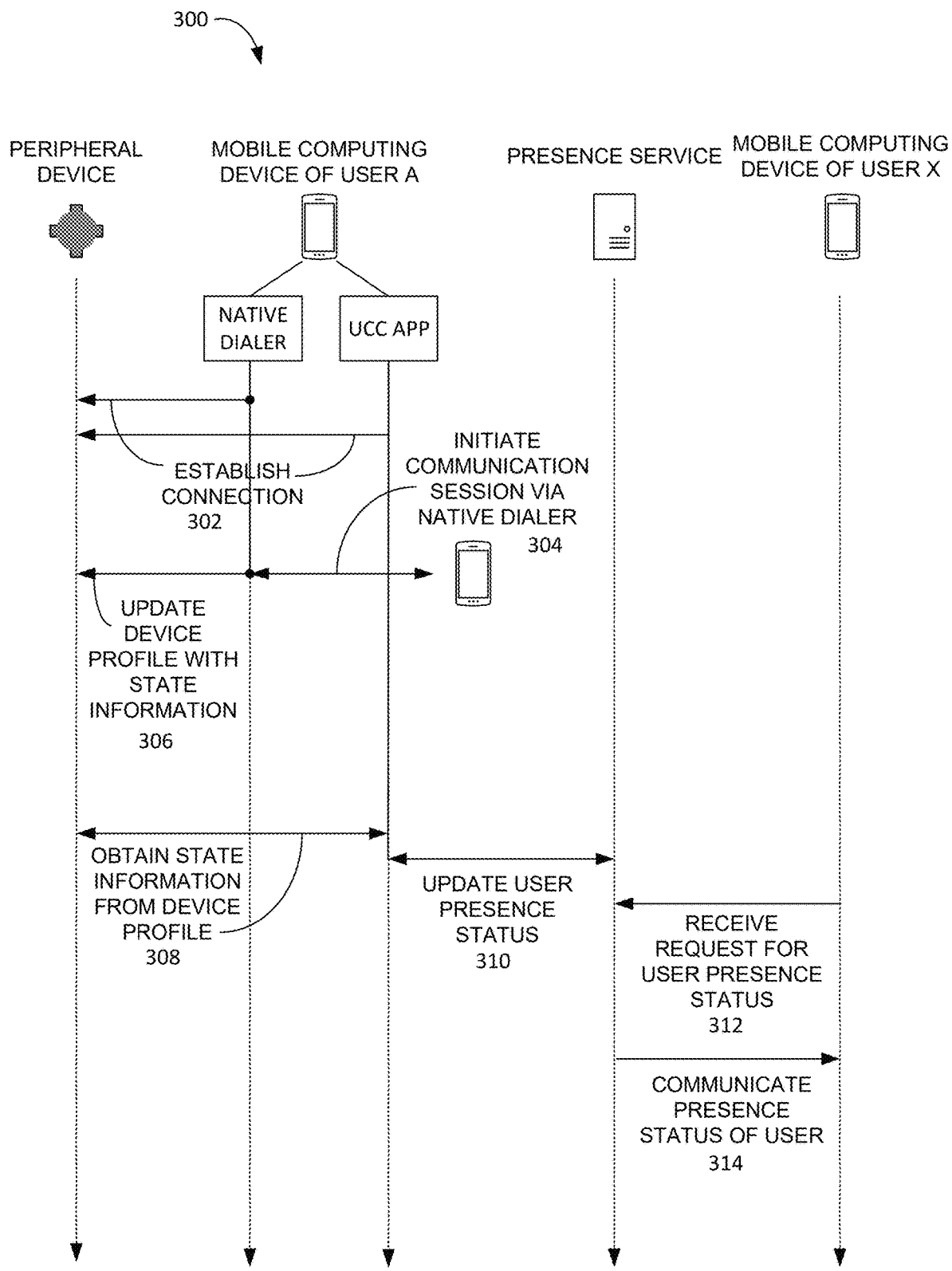
FIG. 3 is a flow diagram detailing the steps for a unified communications client application to update the user presence status based on the active state of a peripheral device during a communication session, consistent with some examples.

FIG. 3 is a flow diagram that illustrates the process by which a UC client application 204-B obtains state information from a peripheral device 202 when the peripheral device 202 is engaged in a communication session using a native dialer application 204-A. The diagram details the steps taken to update the user's presence status within the UC presence service 206-B, ensuring that incoming calls are handled appropriately, and that the user's status is accurately communicated to other users within the network.

The process begins at operation 302, where both the native dialer application 204-A and the UC client application 204-B establish respective connections with the peripheral device 202. This connection is typically wireless and may be facilitated by Bluetooth, Wi-Fi, or another suitable technology that allows the applications to communicate with the peripheral device 202.

At operation 304, the native dialer application 204-A on the user's mobile computing device 204 initiates a communication session, such as a phone call, and the peripheral device 202 is utilized for this session. The native dialer application 204-A then updates the device profile of the peripheral device 202 with state information reflecting its active engagement in the communication session, as reflected with reference 306. Specifically, at operation 306, the device profile of the peripheral device 202 is updated with the state information indicating that it is currently in use. This state information provides a real-time status of the peripheral device's engagement.

Next, at operation 308, the UC client application 204-B obtains the state information from the device profile of the peripheral device 202. This can be achieved through a direct query to the peripheral device 202 or by accessing the device profile stored within the user's computing device 204. Alternatively, with some embodiments, a process executing on the peripheral device may proactively push updates to all connected devices. As such, the UCC app 204-B may receive the state information from the profile of the peripheral device, directly from the peripheral device.

Once the UCC application 204-B has the state information, it proceeds to operation 310, where the UC client application 204-B updates the user presence status within the UCC platform. The updated status reflects that the user is currently engaged in a communication session and is therefore unavailable for additional UC client calls or sessions.

At operation 312, the UC client application 204-B may receive a request for the user's presence status. This request could come from other users within the network or from the UC service itself, which needs to know the user's availability. Finally, at operation 314, the UC client application 204-B communicates the presence status of the user to the network. This status is shared with other users and services within the UC platform, informing them that the user is unavailable due to the ongoing call via the native dialer application.

In an alternative embodiment to the scenario depicted in FIG. 3, where the UC client application and the native dialer application are shown to be executing on the same mobile computing device, consider a situation where the UC client application is not present on User A's mobile phone. Instead, User A has a separate computing device, such as a laptop or tablet computer, on which the UC client application is installed and operational. This separate computing device is paired with and maintains a connection to the peripheral device 202, which is concurrently engaged in an active communication session via the native dialer on User A's mobile phone 204.

In this embodiment, the separate computing device, equipped with the UC client application, is capable of accessing the device profile of the peripheral device 202 to ascertain its active state. The device profile, which includes the state information indicating the ongoing communication session, can be queried by the UC client application on the separate computing device. This allows the UC client application to infer the user's current engagement in a call, even though the call was initiated by the native dialer 204-A on a different device.

Upon obtaining the state information from the peripheral device's profile, the UC client application on the separate computing device updates User A's presence status within the UC platform to reflect their unavailability. This updated status is then communicated across the UC network, ensuring that any incoming communication requests directed to User A through the UC service on the separate computing device are handled appropriately. For example, other users attempting to reach User A via the UC application on the laptop or tablet will be informed of User A's engagement in a call on the mobile phone, and the UC client application can manage the incoming requests accordingly, such as by diverting them to voicemail or providing a busy signal.

This alternative embodiment highlights the flexibility of the invention in accommodating various device configurations and user scenarios, ensuring that the user's presence status is accurately maintained across multiple devices and applications within the unified communications environment.

In certain embodiments, the peripheral device is configured to proactively communicate its state information to all devices it is actively connected with. This means that when there is a change in the state of the peripheral device, such as when it becomes engaged in a communication session via the native dialer application, the peripheral device automatically sends an update to the connected devices without the need for a specific query. This autonomous communication ensures that the UCC application on any connected device, such as User A's laptop or tablet, is immediately informed of the peripheral's engagement, allowing for real-time updates to the user's presence status within the UCC platform.

This automatic update mechanism simplifies the process of presence status management by eliminating the need for the UCC application to continuously poll the peripheral device for its current state. It enhances the efficiency of the system by reducing the communication overhead and potential delays associated with periodic querying. As soon as the peripheral device enters into an active state, it sends a signal to the UCC application, which can then promptly update the user's presence status to 'unavailable' due to the ongoing call, and manage incoming UCC calls accordingly.

In other embodiments, the peripheral device may not have the capability to automatically communicate its state changes. In such cases, each connected device must periodically query the peripheral device to obtain the latest state information. The UCC application on User A's separate computing device, for instance, would send periodic requests to the peripheral device to check whether it is currently in use. Upon receiving a query, the peripheral device responds with its current state information, which the UCC application then uses to update the user's presence status. While this method requires a more active role from the UCC application in monitoring the state of the peripheral device, it still ensures that the user's presence status is kept up-to-date across the unified communications network, allowing for the appropriate handling of incoming calls and communication requests.

Figure 4:
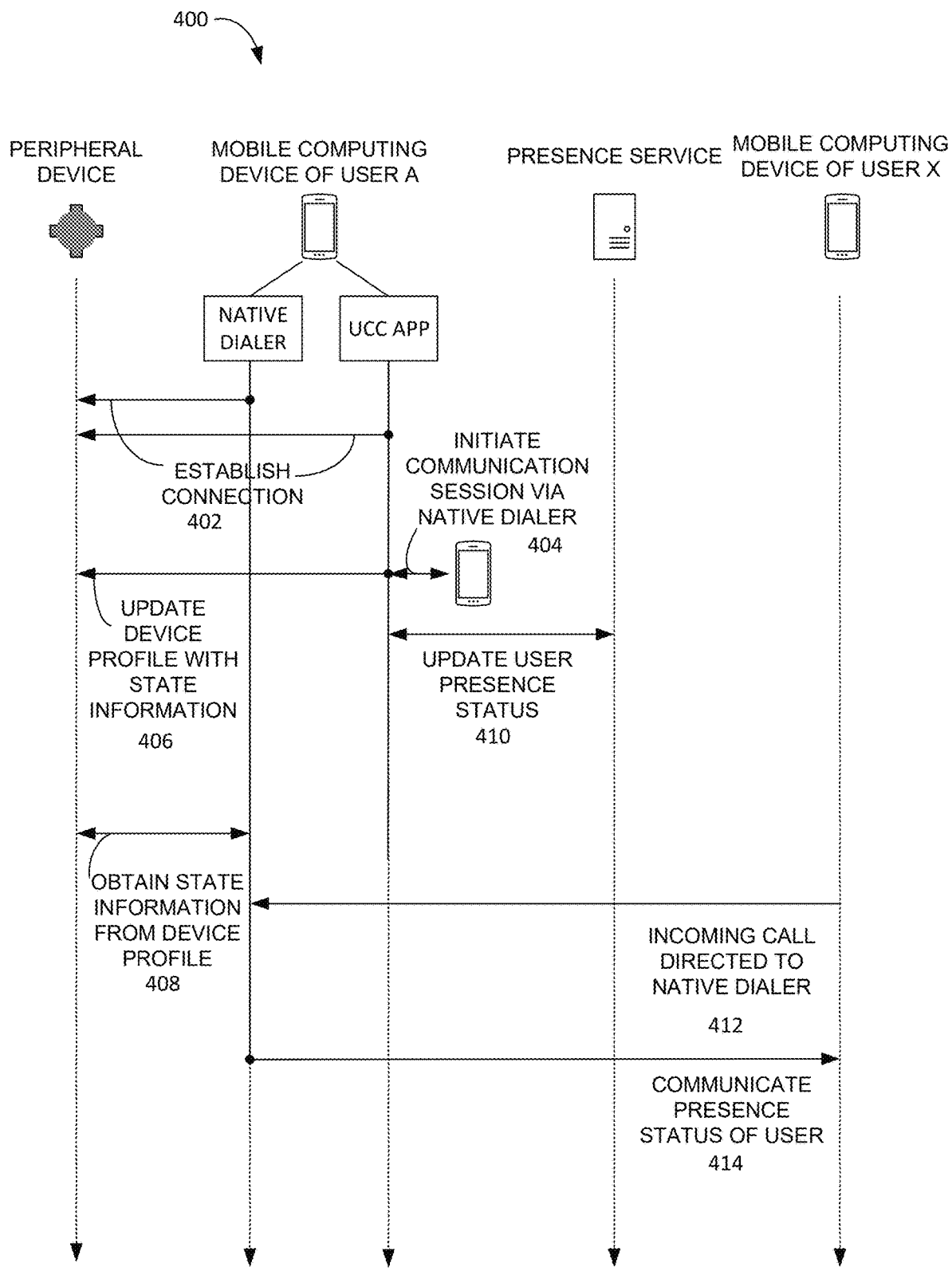
FIG. 4 is a flow diagram showing the process for a native dialer application to handle an incoming call when the user presence status of a unified communications service indicates the user is engaged in an active communication session via another communications application, consistent with some examples.

FIG. 4 illustrates a method where the roles of the communication applications are reversed from the scenario depicted in FIG. 3. Consistent with some embodiments and as illustrated by the method shown in FIG. 4, the UC client application 204-B is actively engaged in a communication session, and the native dialer application must intelligently handle incoming calls based on the state information obtained from the shared device profile of the peripheral device.

The method begins at operation 402, where the UC client application 204-B and the native dialer application 204-A establish respective connections with the paired peripheral device 202. The peripheral device 202 could be any audio-visual equipment, such as a headset or speakerphone, that is used to facilitate the communication session.

At operation 404, the UC client application 204-B initiates a communication session, leveraging the peripheral device 202. Then, at operation 406, the UC client application 204-B updates the device profile of the peripheral device 202 with state information to reflect that it is currently active in a communication session. In addition, the UC client application, at operation 404, update the user presence status with the presence service 206-B. The state information indicates the engagement of the peripheral device 202 with the UC client application 202, while the presence status serves the same or a similar purpose for the UC platform.

Moving to operation 410, the native dialer application 204-A on the user's mobile computing device 204 is prepared to initiate or receive a communication session. However, before it can proceed, it queries the peripheral device for state information. At operation 410, the native dialer application 204-A obtains the state information from the device profile of the peripheral device 202. This can be achieved by querying the peripheral device, as shown in FIG. 4, or alternatively by accessing a device profile as stored within the computing device 204.

Once the native dialer application 204-A has the state information, it proceeds to operation 412, where it intelligently handles an incoming call based on the active state of the peripheral device 202. If the peripheral device 202 is engaged in a UC session, the native dialer application 204-A can take appropriate actions to manage the incoming call without disrupting the ongoing UC communication session.

At operation 414, in response to the incoming call directed to the native dialer application, given the user's current engagement in a UC session, the native dialer 204-A will handle this call in a way that respects the ongoing communication session.

The method illustrated in FIG. 4 demonstrates an approach to managing communication sessions across different applications by leveraging shared device profiles. It ensures that the user's engagement in a UC session is not interrupted by incoming calls on the native dialer application, and that callers are provided with clear and accurate information regarding the callee's availability. In the context of FIG. 4, and potentially FIG. 3, the shared device profile for a peripheral device may exist in two locations: on the peripheral device itself and on each computing device that pairs with the peripheral device. To maintain consistency and ensure that the state information is synchronized across these profiles, various protocols can be employed.

When a peripheral device is engaged in a communication session, it updates its own device profile with the current state information, indicating that it is active. This update triggers a synchronization protocol that communicates the new state to all paired computing devices. The protocol could be a simple push notification where the peripheral device broadcasts its updated state to all connected devices, or it could be a more complex synchronization process that involves a handshake and confirmation to ensure the integrity of the data transfer.

Consistent with some embodiments, each computing device maintains its own copy of the shared device profile, which includes the state information of the peripheral device. When a computing device receives an update from the peripheral device, it processes the incoming data and updates its local copy of the device profile accordingly. This ensures that the computing device's communication and messaging applications have access to the latest information regarding the peripheral device's engagement.

To keep the device profiles in sync, the computing devices may also periodically query the peripheral device for its current state. This polling mechanism acts as a fail-safe to catch any missed updates due to connectivity issues or other errors. The peripheral device responds to these queries with its current state, allowing the computing devices to correct any discrepancies in their local profiles.

In scenarios where the peripheral device does not have the capability to initiate communication, the synchronization protocol may be driven by the computing devices. Upon establishing a connection with the peripheral device, a computing device might send a request for the current state information. The peripheral device responds with the requested data, and the computing device updates its local profile. This process may occur at regular intervals or be triggered by specific events, such as the start of a communication session or when a new device pairs with the peripheral device.

The synchronization protocols are designed to be robust and efficient, minimizing the overhead on both the peripheral device and the computing devices while ensuring that the user's presence status is accurately reflected across all applications and devices in the unified communications system. This synchronization is crucial for the seamless operation of the system, as it allows for intelligent handling of incoming calls and accurate representation of the user's availability to other users within the network.

Thus far, the data structure that has been described as storing the state information of a peripheral device has been referred to as a "device profile." Those skilled in the art will recognize that various data structures serving the same or a similar purpose may be referred to by various other names, depending upon the context in which those data structures are implemented. Some of these include, for example:

Device Descriptor: In USB terminology, a device descriptor contains information about a USB device as a whole.

Service Record: In Bluetooth, a service record provides information about the characteristics and capabilities of a Bluetooth service.

Resource Record: In networking, particularly with DNS-based service discovery, a resource record can contain details about a network resource, including its state.

Capability Information: This term is used to describe the functions and features that a device supports.

Device Attributes: Attributes are often used in various protocols to represent the properties and current states of a device.

Device State Object: In object-oriented programming, a state object might encapsulate the current status and other dynamic properties of a device.

Configuration Profile: This can include settings and state information that dictate how a device operates or connects with other devices.

Status Register: In hardware and low-level software, a status register is a collection of bits that a processor or peripheral device uses to indicate its current state.

Endpoint Descriptor: In certain communication protocols, an endpoint descriptor can define the status and capabilities of an endpoint that is part of a communication session.

Device Management Entity (DME): In mobile device management, a DME can store and manage the state and configuration of a mobile device.

Each of these data structures can be used within the context of a system, device or protocol to track and manage the status, capabilities, and other operational parameters of a device. The choice of term or structure often depends on the specific technology or protocol being used.

Machine and Software Architecture

Figure 5:
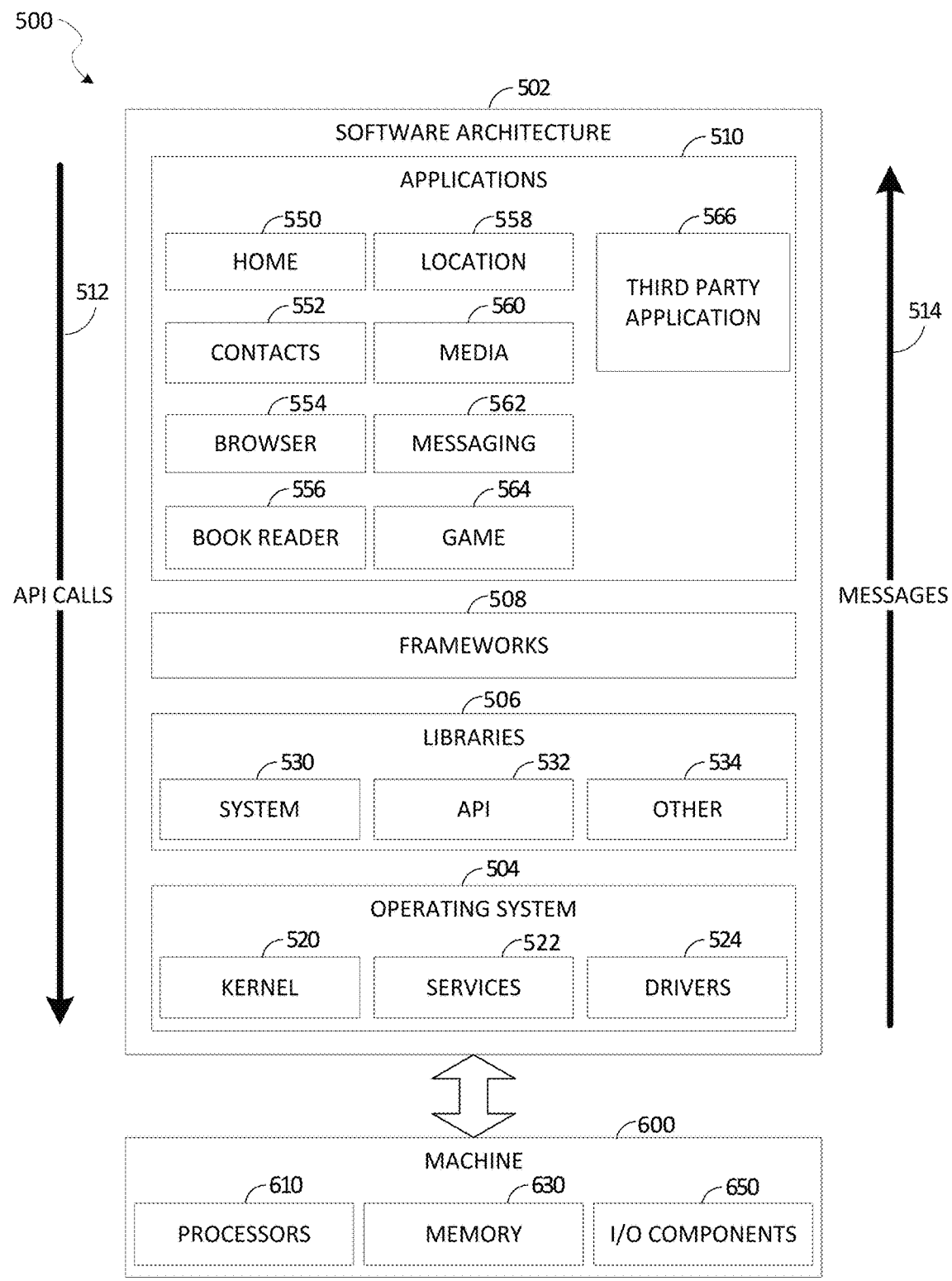
FIG. 5 is a block diagram illustrating a software architecture, which can be installed on any of a variety of computing devices to perform methods consistent with those described herein.
Figure 6:
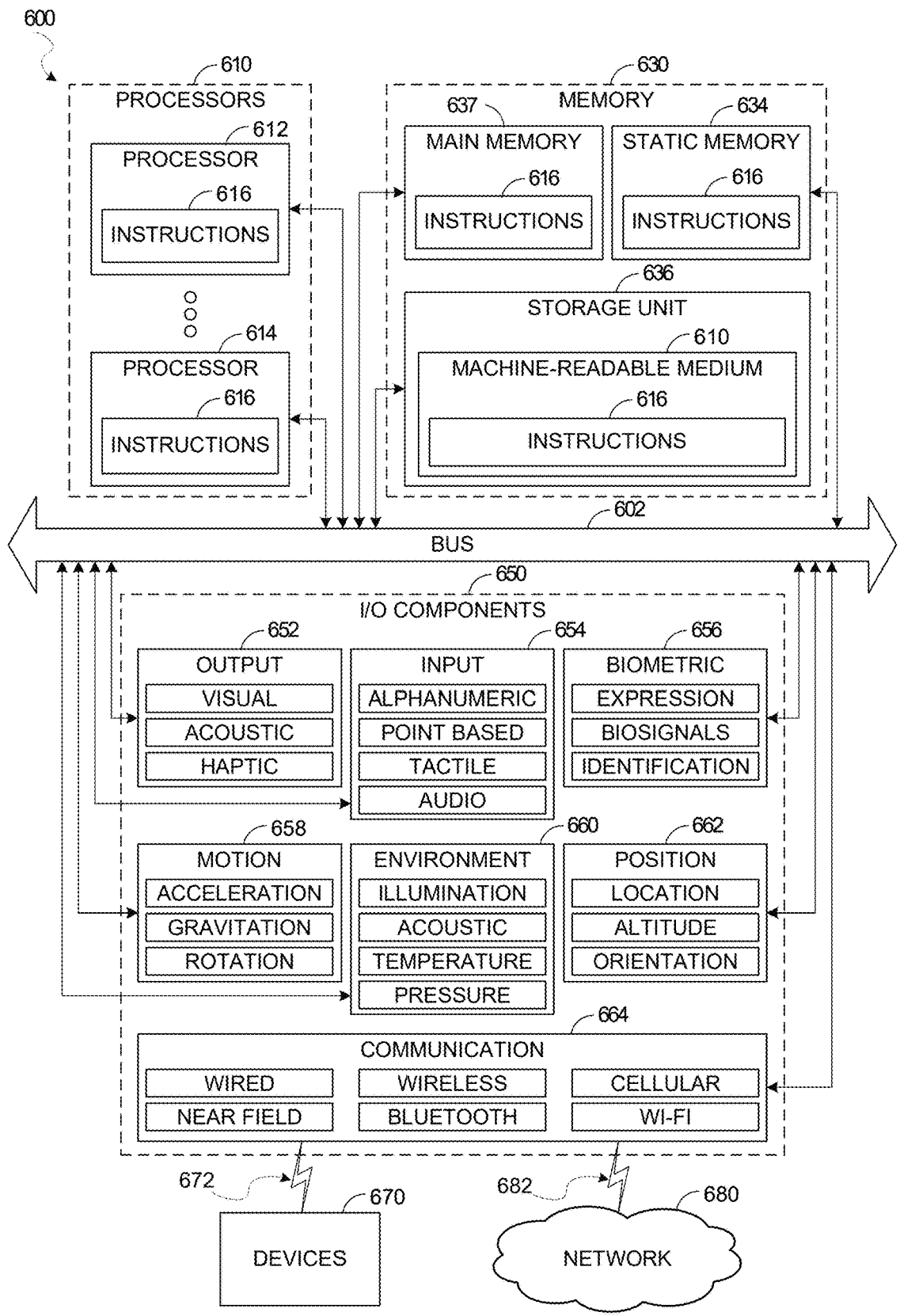
FIG. 6 illustrates a diagrammatic representation of a machine in the form of a computer system (e.g., a server computer) within which a set of instructions may be executed for causing the machine to perform any one or more of the methodologies discussed herein, according to an example embodiment.

FIG. 5 is a block diagram 500 illustrating a software architecture 502, which can be installed on any of a variety of computing devices to perform methods consistent with those described herein. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 602 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4). Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various GUI functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 512 provided by the operating system 504 to facilitate functionality described herein.

FIG. 10 illustrates a diagrammatic representation of a machine 1000 in the form of a computer system within which a set of instructions may be executed for causing the machine to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example the instructions 1016 may cause the machine 1000 to execute any one of the methods or algorithmic techniques described herein. Additionally, or alternatively, the instructions 1016 may implement any one of the systems described herein. The instructions 1016 transform the general, non-programmed machine 1000 into a particular machine 1000 programmed to carry out the described and illustrated functions in the manner described.

In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 516 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 may include a main memory 1032, a static memory 1034, and a storage unit 1036, all accessible to the processors 1010 such as via the bus 1002. The main memory 1030, the static memory 1034, and storage unit 1036 store the instructions 1016 embodying any one or more of the methodologies or functions described herein. The instructions 516 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The U/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 10510, environmental components 1060, or position components 1062, among a wide array of other components. For example, the biometric components 1056 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a USB).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 630, 632, 634, and/or memory of the processor(s) 610) and/or storage unit 636 may store one or more sets of instructions and data structures (e.g., software) embodying or utilized by any one or more of the methodologies or functions described herein. These instructions (e.g., the instructions 616), when executed by processor(s) 610, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 680 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks. Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., HTTP). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A computer-implemented method for managing user presence, the method comprising:
    establishing, by a computing device, a connection with a computing resource, the computing device associated with a user account and comprising a first communication application and a second communication application;
    establishing, by the computing device and via the first communication application, a communication session between the computing device and at least a second device, wherein the computing resource is registered at the computing device to be utilized for handling the first communication session;
    in response to establishing the first communication session via the first communication application, updating state information for the computing resource, the state information indicating that that the computing resource is in an active state due to the first communication session via the first communication application;
    during the communication session:
        obtaining the state information of the computing resource; and
        according to the state information of the computing resource indicating that the computing resource is in an active state due to the first communication session, updating a user presence status of the user account indicating that the user account is currently in an active operation state;
    receiving a request to establish a second communication session with the computing device via the second communication application;
    accessing, by the second communication application, the presence status of the user account;
    in response to the accessed presence status representing that the user account is currently in an active operation state, deferring the second communication session or providing a notification to a requesting party that the user is currently engaged; and
    in response to the accessed presence status representing that the user account is currently not in an active operation state, proceeding with establishing the second communication session.

2. The computer-implemented method of claim 1, wherein the computing resource is an integrated input/output ("I/O") device of the computing device and updating state information for the integrated I/O device comprises updating a system resource status.

3. The computer-implemented method of claim 1, wherein the first communication application is a native dialer application and the second communication application is a unified communications (UC) client application to facilitate a communication session with a communications service of a unified communications service.

4. The computer-implemented method of claim 3, wherein updating the user presence status of the user comprises:
    communicating, by the UC client application, the user presence status to a cloud-based user presence service integral with the unified communications service;
    wherein, upon processing, by the cloud-based communications service of the unified communications service, an incoming communication request directed to a user of the UC client application, notifying a caller that the user is unavailable.

5. The computer-implemented method of claim 3, wherein the computing resource is a peripheral device and updating state information for the peripheral device comprises updating a device profile for the peripheral device.

6. The computer-implemented method of claim 5, wherein the device profile for the peripheral device resides in memory of the peripheral device, and the UC client application obtains the state information by querying the peripheral device for the state information stored within its device profile.

7. The computer-implemented method of claim 5, wherein obtaining, by the UC client application, the state information of the peripheral device comprises:
    receiving the state information of the peripheral device from the peripheral device, wherein the peripheral device is configured to automatically communicate the state information to the UC client application upon a state change without requiring a specific query from the UC client application for the state information.

8. The computer-implemented method of claim 5, wherein the device profile for the peripheral device resides in memory of the user computing device, and the UC client application obtains the state information directly from the device profile as stored within the memory of the user computing device.

9. The computer-implemented method of claim 5, further comprising:

detecting, by the UC client application, an end of the communication session initiated by the native dialer application based on obtaining updated state information as reflected in a device profile of the peripheral device; and updating, by the UC client application, the user presence status of the user to reflect availability for new communication sessions.

10. The computer-implemented method of claim 5, wherein the peripheral device further comprises a display, and the display is used for presenting video when the communication session is a video conference.

11. The computer-implemented method of claim 5, wherein the peripheral device further comprises a microphone and a speaker, the microphone used to capture audio input and the speaker used to output audio, during the communication session.

12. The computer-implemented method of claim 1, wherein the computing resource is a peripheral device and the connection between the user computing device and the peripheral device is a wireless connection established using short-range wireless communication technology, and the peripheral device comprises one of a wireless speaker, a wireless headset, or wireless earbuds, each capable of being paired with multiple devices simultaneously and supporting various wireless communication standards or protocols.

13. A system for managing user presence, the system comprising:
a computing device associated with a user account, the computing device comprising a first communication application and a second communication application, wherein the computing device is configured to perform operations comprising:
establishing a connection with a computing resource;
establishing a communication session between the first communication application of the computing device and at least a second device, wherein the computing resource is registered at the computing device to be utilized for handling the first communication session;
in response to establishing the first communication session via the first communication application, updating state information for the computing resource, the state information indicating that that the computing resource is in an active state due to the first communication session via the first communication application;
during the communication session:
obtaining the state information of the computing resource; and
according to the state information of the computing resource indicating that the computing resource is in an active state due to the first communication session, updating a user presence status of the user account indicating that the user account is currently in an active operation state;
receiving a request to establish a second communication session with the computing device via the second communication application;
accessing, by the second communication application, the presence status of the user account;
in response to the accessed presence status representing that the user account is currently in an active operation state, deferring the second communication session or providing a notification to a requesting party that the user is currently engaged; and
in response to the accessed presence status representing that the user account is currently not in an active operation state, proceeding with establishing the second communication session.

14. The system of claim 13, wherein the computing resource is an integrated input/output ("I/O") device of the computing device and updating state information for the integrated I/O device comprises updating a system resource status.

15. The system of claim 13, wherein the computing resource is a peripheral device and the second communication application is further configured to update a device profile for the peripheral device, the device profile residing in memory of the peripheral device, and wherein the second communication application is configured to obtain the state information by querying the peripheral device for the state information stored within its device profile.

16. The system of claim 13, wherein the first communication application is a native dialer application and the second communication application is a unified communications (UC) client application configured to facilitate a communication session with a communications service of a unified communications service.

17. The system of claim 16, wherein the second communication application is further configured to communicate a user presence status to a cloud-based user presence service integral with a unified communications service, and wherein the system further comprises a cloud-based communications service configured to process incoming communication requests directed to the user of the UC client application and to notify callers that the user is unavailable when the user presence status indicates unavailability.

18. The system of claim 17, wherein the UC client application is configured to receive the state information of the peripheral device from the peripheral device without requiring a specific query for the state information, the peripheral device being configured to automatically communicate the state information to the UC client application upon a state change.

19. The system of claim 17, wherein obtaining the state information of the peripheral device comprises:
receiving the state information of the peripheral device from the peripheral device, wherein the peripheral device is configured to automatically communicate the state information to the UC client application upon a state change without requiring a specific query from the UC client application for the state information.

20. A computer-implemented method for managing user presence, the method comprising:
establishing, by a computing device, a connection with a peripheral device, the computing device associated with a user account and comprising a first communication application and a second communication application, the first communication application being a native dialer application and the second communication application being a unified communications (UC) client application associated with a UC service;
establishing, by the computing device and via the native dialer application, a communication session between the computing device and at least a second device, wherein the peripheral device is registered at the computing device to be utilized for handling the first communication session;
in response to establishing the first communication session via the native dialer application, updating state information for the peripheral device, the state information indicating that that the peripheral device is in an active state due to the first communication session via the native dialer application;

during the communication session:
  obtaining the state information of the peripheral device; and
  according to the state information of the peripheral device indicating that the peripheral device is in an active state due to the first communication session, updating a user presence status of the user account indicating that the user account is currently in an active operation state;
  receiving a request to establish a second communication session with the computing device via the UC client application;
  accessing, by the UC client application, the presence status of the user account;
  in response to the accessed presence status representing that the user account is currently in an active operation state, deferring the second communication session or providing a notification to a requesting party that the user is currently engaged; and
  in response to the accessed presence status representing that the user account is currently not in an active operation state, proceeding with establishing the second communication session.

* * * * *